US007760945B2

(12) United States Patent
Hideaki

(10) Patent No.: US 7,760,945 B2
(45) Date of Patent: Jul. 20, 2010

(54) THERMAL TRANSFER TYPE IMAGE FORMING APPARATUS AND METHOD OF INDICATING/DETECTING REMAINING AMOUNT OF INK RIBBON

(75) Inventor: Kawada Hideaki, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1170 days.

(21) Appl. No.: 11/368,643

(22) Filed: Mar. 7, 2006

(65) Prior Publication Data

US 2006/0239744 A1 Oct. 26, 2006

(30) Foreign Application Priority Data

Apr. 26, 2005 (KR) ...................... 10-2005-0034570

(51) Int. Cl.
*G06K 9/00* (2006.01)

(52) U.S. Cl. ....................... 382/181; 382/192; 382/195; 382/197

(58) Field of Classification Search ................. 382/181, 382/195, 197, 192
See application file for complete search history.

(56) References Cited

U.S. PATENT DOCUMENTS 5,691,961 A * 11/1997 Paranjpe ..................... 347/217
5,803,627 A 9/1998 Paranjpe
2004/0136768 A1* 7/2004 Klinefelter et al. .......... 400/663

FOREIGN PATENT DOCUMENTS

| | | |
|---|---|---|
| JP | 61244581 | 10/1986 |
| JP | 62-021574 | 1/1987 |
| JP | 62119062 | 5/1987 |
| JP | 62-121079 | 6/1987 |
| JP | 02-147375 | 6/1990 |
| JP | 03-138178 | 6/1991 |
| JP | 05-162406 | 6/1993 |
| JP | 06191069 | 7/1994 |
| JP | 2000-168211 | 6/2000 |
| JP | 2000-168213 | 6/2000 |

OTHER PUBLICATIONS

European Search Report dated Sep. 29, 2006 issued in EP 6112497.

* cited by examiner

*Primary Examiner*—Matthew C Bella
*Assistant Examiner*—Mike Rahmjoo
(74) *Attorney, Agent, or Firm*—Stanzione & Kim, LLP

(57) ABSTRACT

A method of indicating and detecting a remaining amount of an ink ribbon having a transparent sheet on which an ink layer is formed in a thermal transfer type image forming apparatus which prints an image by applying heat from a thermal head to the ink ribbon to transfer ink to a sheet of paper. In the method, a print number mark that is optically detectable is formed by removing part of the ink layer by applying heat to the ink ribbon from the thermal head, and the print number mark is detected using an optical sensor before a subsequent print starts to determine the remaining amount of the ink ribbon.

12 Claims, 6 Drawing Sheets

THERMAL TRANSFER TYPE IMAGE FORMING APPARATUS AND METHOD OF INDICATING/DETECTING REMAINING AMOUNT OF INK RIBBON

CROSS-REFERENCE TO RELATED APPLICATIONS

This application claims the benefit under 35 U.S.C. §119 of Korean Patent Application No. 2005-34570, filed on Apr. 26, 2005, in the Korean Intellectual Property Office, the disclosure of which is incorporated herein in its entirety.

BACKGROUND OF THE INVENTION

1. Field of the Invention

The present general inventive concept relates to a thermal transfer type image forming apparatus using an ink ribbon, and a method of detecting a remaining amount of the ink ribbon.

2. Description of the Related Art

An ink ribbon is a source for supplying transfer ink used for a thermal transfer type image forming apparatus, which includes a sublimation type or a fusing type image forming apparatus. The ink ribbon is typically loaded in a cassette installed in the image forming apparatus. The ink ribbon has a plurality of print areas corresponding to the size of a print paper, and each of the print areas is coated with an ink layer. The ink ribbon is wound around a supply reel and a take-up reel to be loaded in the cassette.

There are a variety of types of ink ribbons, according to the sizes of the print paper, such as an A6 size or a card size, the sensitivity of a dye (or a pigment), or the presence of an over coating area. A user selects an appropriate ink ribbon cassette according to the purpose of printing and installs the selected ink ribbon cassette in the image forming apparatus. Accordingly, there may be a case in which the ink ribbon cassette needs to be replaced with another type before it is totally consumed.

When the ink ribbon cassette is replaced with a new ink ribbon cassette, the printer needs to change a system control method or a print condition according to the type of the new ink ribbon cassette. Thus, an identification mark, such as an identification hole or an optical mark, is provided in the case of the ink ribbon cassette. The identification mark is detected using a sensor so that the total number of printable pages or the type of ink ribbon can be determined. Since this information is intrinsic to the ink ribbon, the information remains unchanged regardless of increments of the number of printed pages. Thus, although different types of ink ribbon cassettes can be interchanged, the printer can easily detect the type of ink ribbon.

However, since the ink ribbon is wound around the supply reel and the take-up reel, if the number of printed pages is not recorded, it is difficult to recognize how many more pages the printer can print using the ink ribbon. In the case in which the same ink ribbon is used until no ink remains, it is possible to recognize the number of pages which can printed in the future (i.e. the remaining amount of the ink ribbon) by resetting the number of printable pages whenever the ink ribbon cassette is replaced and recording the accumulated number of printed pages in a memory. In most cases, however, when the purpose of printing changes, for example, an image is to be printed on A5-sized paper after printing on A6-sized paper, the ink ribbon cassette is generally replaced corresponding to the purpose of printing. Therefore, although the number of printed pages is recorded in the memory, the remaining amount of the ink ribbon is difficult to determine.

SUMMARY OF THE INVENTION

The present general inventive concept provides a thermal transfer type image forming apparatus which can easily indicate a remaining amount of an ink ribbon usable to print an image, even when an ink ribbon cassette is replaced, and a method of indicating and detecting the remaining amount of the ink ribbon.

Additional aspects and utilities of the present general inventive concept will be set forth in part in the description which follows and, in part, will be obvious from the description, or may be learned by practice of the general inventive concept.

The foregoing and/or other aspects of the present general inventive concept are achieved by providing a method of indicating and detecting a remaining amount of an ink ribbon having a transparent sheet on which an ink layer is formed in a thermal transfer type image forming apparatus which prints an image by applying heat from a thermal head to the ink ribbon to transfer ink to a sheet of paper, the method including forming a print number mark that is optically detectable on the ink ribbon by removing part of the ink layer by applying heat to the ink ribbon from the thermal head, and detecting the print number mark using at least one optical sensor before a subsequent print starts to determine the remaining amount of the ink ribbon.

The forming of the print number mark may include forming the print number mark on the ink ribbon after printing is complete.

The forming of the print number mark may further include stopping the ink ribbon after the print number mark is formed, before the print number mark reaches a position of the at least one optical sensor.

The print number mark may indicate the remaining amount of the ink ribbon that is obtained by subtracting an accumulated print number from a total printable number or an accumulated print number.

The forming of the print number mark may include forming the print number mark whenever a sheet of paper is printed. The forming of the print number mark may include when a plurality of pages are printed continuously, forming the print number mark after the plurality of pages are printed.

The forming of the print number mark may include forming a number information portion in a binary system, and forming a sync information portion having figures corresponding to the number information portion, and the detecting of the print number mark may include detecting the number information portion and the sync information portion using two optical sensors.

The ink ribbon may include a plurality of print areas divided corresponding to a length of the sheet of paper, each having an ink layer of a predetermined color, and a header mark provided at a leading end portion of each of the print areas, on which an ink layer having a low light transmissivity is coated, wherein the forming of the print number mark may include removing a portion of the ink layer of the header mark.

The foregoing and/or other aspects of the present general inventive concept are also achieved by providing a method of controlling a thermal transfer type image forming apparatus, including applying heat to an ink ribbon to transfer ink from the ink ribbon to paper, and applying heat to the ink ribbon to form a print number mark on the ink ribbon corresponding to a remaining usable amount of the ink ribbon.

The foregoing and/or other aspects of the present general inventive concept are also achieved by providing a thermal transfer type image forming apparatus including an ink ribbon having a transparent sheet on which an ink layer is formed and wound around a supply reel and a take-up reel, a thermal head to apply heat corresponding to image information to the ink ribbon to transfer ink from the ink ribbon to a sheet of paper, and to form a print number mark which is optically detectable on the ink ribbon by removing part of the ink layer corresponding to a print number, and at least one optical sensor to detect the print number mark.

The ink ribbon may include a plurality of print areas divided corresponding to a length of the sheet of paper, each having an ink layer of a predetermined color, a plurality of non-print areas having a higher light transmissivity than the print areas and provided at the leading end portions of the print areas to separate the print areas, and a header mark provided in each non-print area, on which an ink layer having a low light transmissivity is coated, wherein the print number mark is formed on the header mark.

The print number mark may include a number information portion presented in a binary system, and a sync information portion having figures corresponding to the number information portion, and the at least one optical sensor comprises first and second optical sensors which detect the number information portion and the sync information portion, respectively.

The first and second optical sensors may be disposed between the thermal head and the take-up reel.

The foregoing and/or other aspects of the present general inventive concept are also achieved by providing a thermal transfer type image forming apparatus, including an ink ribbon having an ink layer disposed thereon, and a thermal head to apply heat to the ink ribbon to transfer ink from the ink layer to paper and to form a print number mark on the ink ribbon corresponding to a remaining usable amount of the ink ribbon.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
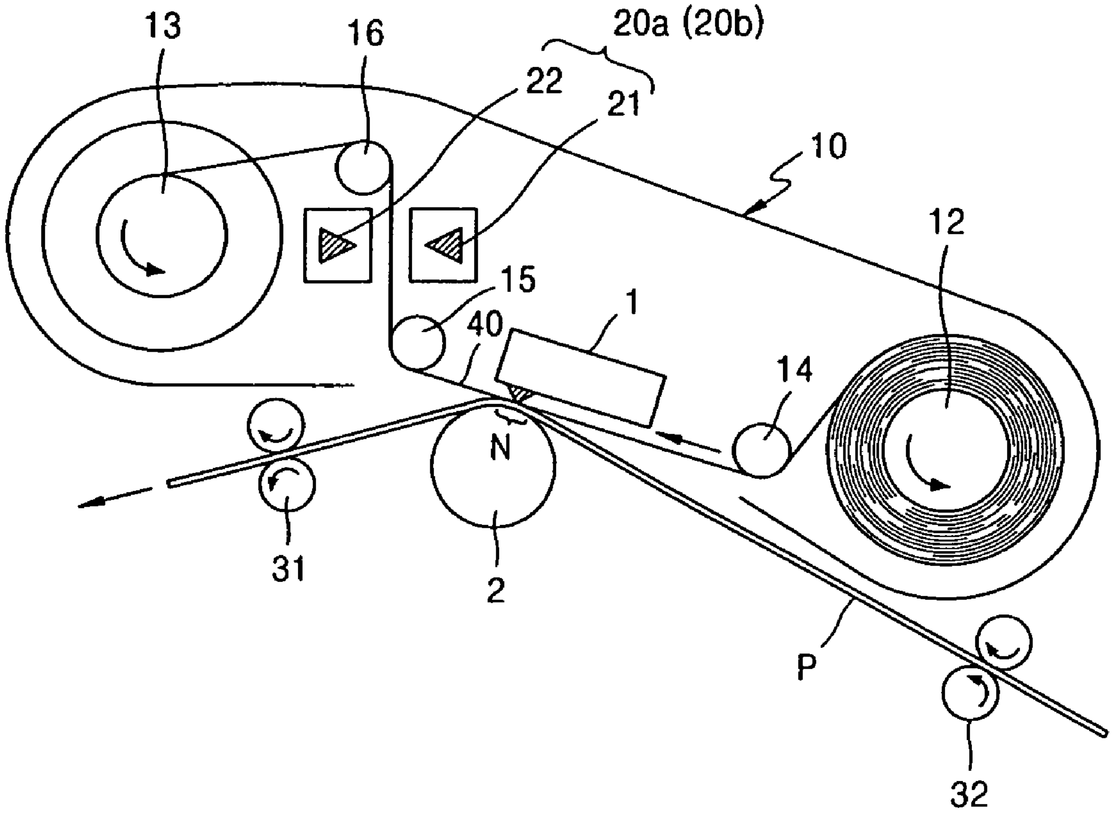
FIG. 1 is a view illustrating a construction of a thermal transfer type image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a construction of a thermal transfer type image forming apparatus having a thermal head 1 according to an embodiment of the present general inventive concept. Referring to FIG. 1, the thermal head 1 includes a plurality of heating devices that are individually controllable and arranged perpendicular to a direction in which paper P is transferred. A platen roller 2 faces the thermal head 1 to form a print nip N. An ink ribbon 40 is accommodated in an ink ribbon cassette 10. The ink ribbon 40 is wound around a supply reel 12 and a take-up reel 13. The ink ribbon 40 between the supply reel 12 and the take-up reel 13 is guided by guide posts 14, 15, and 16. Transfer units 31 and 32 transfer the paper P through the print nip N. When the supply reel 12 and the take-up reel 13 are rotated by a drive unit (not shown), the ink ribbon 40 is transferred in the direction in which the paper P is transferred. When the ink ribbon cassette 10 is installed in an image forming apparatus, the ink ribbon 40 is located between a light emission portion 21 and a light receiving portion 22 of optical sensors 20*a* and 20*b*.

Figure 2:
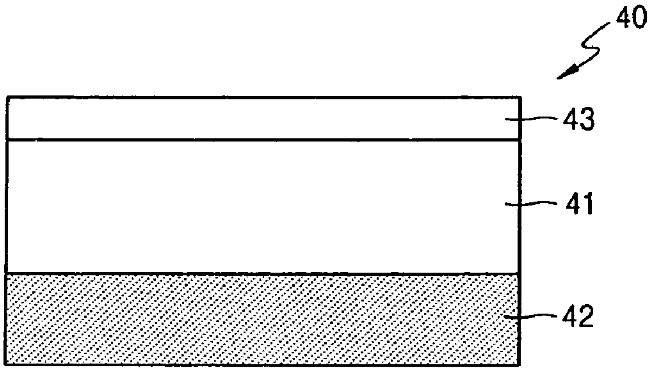
FIG. 2 is a cross-sectional view illustrating an exemplary ink ribbon according to an embodiment of the present general inventive concept.
Figure 3:
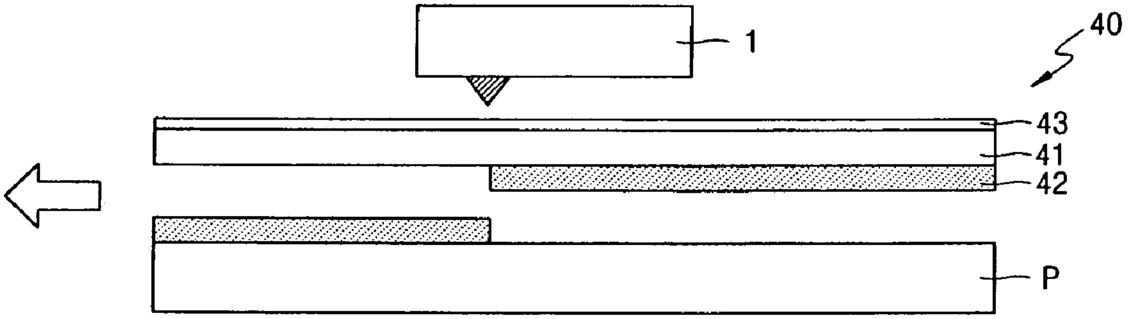
FIG. 3 is a view illustrating a process of printing an image using the ink ribbon of FIG. 2.

The ink ribbon 40 and the paper P contact each other as they pass through the print nip N. FIG. 2 is a cross-sectional view illustrating the ink ribbon 40 according to an embodiment of the present general inventive concept, and FIG. 3 illustrates a process of printing an image using the ink ribbon 40 of FIG. 3. Referring to FIGS. 2 and 3, dye or pigment is coated on a surface of a transparent base sheet 41 of the ink ribbon, forming an ink layer 42. An active heat resistant layer 43 to contact the thermal head 1 is formed on a rear surface of the base sheet 41. When heat corresponding to image information is applied using the thermal head 1 to the active heat resistant layer 43 formed on the rear surface of the ink ribbon 40, as illustrated in FIG. 3, a portion of the ink layer 42 is melted or sublimated, and separated from the base sheet 41 to transfer ink from the ink ribbon 40 to the paper P to print an image on the paper P.

Figure 4:
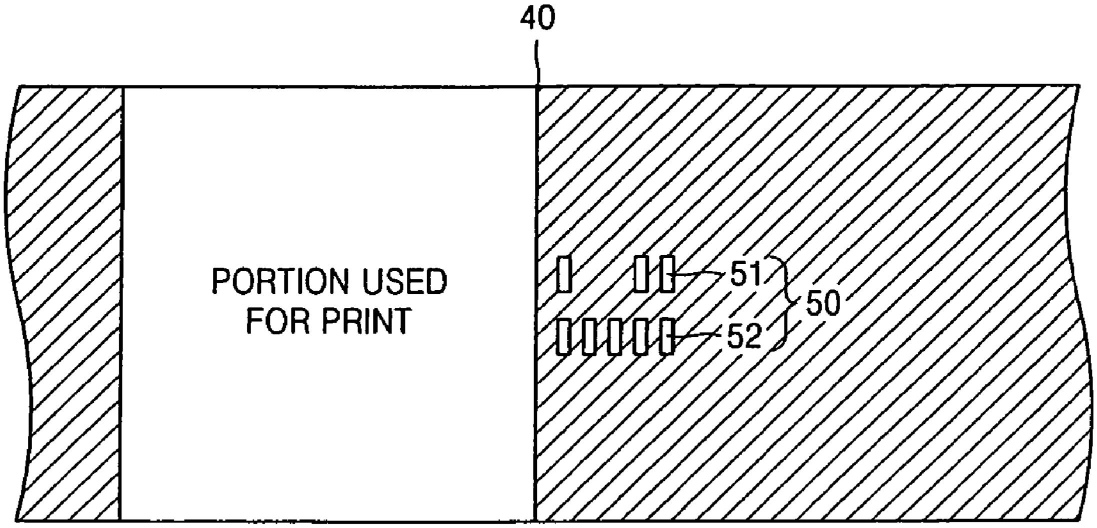
FIG. 4 is a view illustrating an example of forming a print number mark on an ink ribbon without a header mark according to another embodiment of the present general inventive concept.
Figure 5:
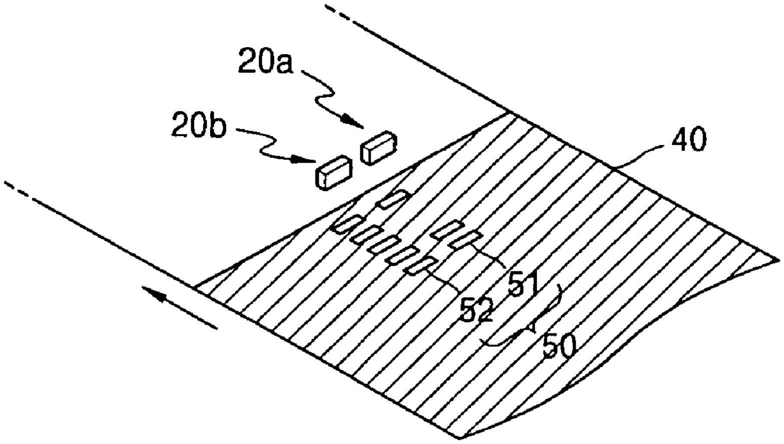
FIG. 5 is a perspective view illustrating a process of detecting the print number mark of FIG. 4 using two optical sensors.

When the printing of the image is complete, a print number mark 50 indicating a remaining usable amount of the ink ribbon 40 is formed, as illustrated in FIG. 4. For example, the thermal head 1 can form the print number mark 50 by applying heat to the ink ribbon 40 to remove ink from the ink layer 42 at a portion of the ink ribbon 40. Since the portion of the ink ribbon 40 where the ink layer 42 is removed exhibits a higher light transmissivity than a portion of the ink ribbon 40 where the ink layer 42 is not removed, the print number mark 50 can be detected using the optical sensors 20*a* and 20*b*. The print number mark 50 can include a number information portion 51 presented in a binary system. The print number mark 50 can further include a sync information portion 52 to indicate figures corresponding to bits of the number information portion 51. For example, referring to FIG. 4, the sync information portion 52 indicates figures (the powers of 2) of $2^4$, $2^3$, $2^2$, $2^1$, and $2^0$ from the left. Therefore, the number information portion 51 indicates a binary number "10011" which stands for 19 in the decimal system. Accordingly, the print number mark 50 indicates that a total of 19 pages have been printed. The image forming apparatus stops the ink ribbon 40 after the print number mark 50 is formed. The print number mark 50 is located between the optical sensors 20*a* and 20*b* and the thermal head 1 when the image forming apparatus stops the ink ribbon 40.

The image forming apparatus winds the ink ribbon 40 slightly onto the take-up reel 13 before a subsequent print is performed. The first and second optical sensors 20*a* and 20*b* respectively detect the number information portion 51 and the sync information portion 52 of the print number mark 50. The remaining usable amount of the ink ribbon 40 is detected by detecting the number information portion 51 and the sync information portion 52 using the first and second optical sensors 20*a* and 20*b*. The detected remaining usable amount of ink of the ink ribbon 40 can be displayed on a display device (not shown) so that a user can view the amount.

Since the print number mark 50 is formed directly on the ink ribbon 40, the remaining usable amount of ink of the ink ribbon 40 can be recognized even when the ink ribbon cassette 10 is removed and reinstalled in the image forming apparatus. Also, since the print number mark 50 is formed using the thermal head 1, the structure of the image forming apparatus according to this embodiment of the present general inventive concept is simpler than that of a conventional image forming apparatus using a magnetic head to indicate the remaining amount of an ink ribbon. Further, since the image forming apparatus stops transferring the ink ribbon 40 before the print number mark 50 reaches the optical sensors 20*a* and 20*b*, the ink ribbon 40 does not need to be rewound to detect the remaining amount of the ink ribbon 40 when a subsequent print is performed or the ink ribbon cassette 10 is reinstalled.

Figure 6:
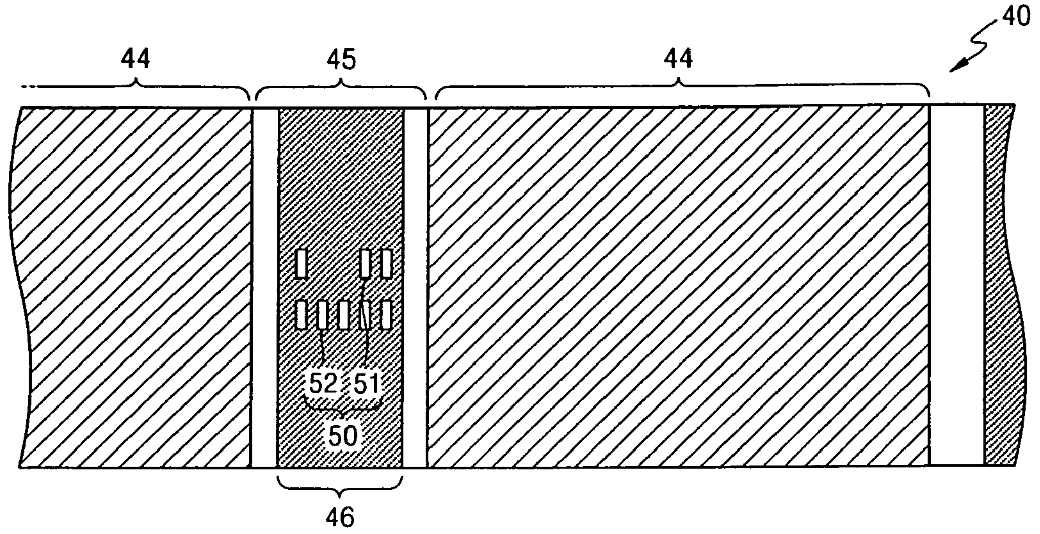
FIG. 6 is a view illustrating an example of forming print number mark on a header mark according to another embodiment of the present general inventive concept.

FIG. 6 illustrates the ink ribbon 40 according to another embodiment of the present general inventive concept. Referring to FIG. 6, the ink ribbon 40 can include a plurality of print areas 44 where the ink layer is formed, and a plurality of non-print areas 45 having a higher light transmissivity, which are continuously and alternately arranged on the ink ribbon 40. One of the non-print areas 45 is provided at a leading end of each of the print areas 44 to separate the print areas 44. A header mark 46 coated with ink exhibiting a relatively low light transmissivity is provided in each non-print area 45. The length of each of the print areas 44 corresponds to the length of a sheet of the paper P The image forming apparatus detects the non-print areas 45 or the header mark 46 using the first and second optical sensors 20*a* and 20*b* or an additional sensor (not shown) and recognizes a start position of each of the print areas 44 based on the header mark 46. When the ink ribbon 40 having such a structure is adopted, the print number mark 50 can be formed on the header mark 46. That is, the number information portion 51 and the sync information portion 52 can be indicated by removing part of the ink coated on the header mark 46 using the thermal head 1. The paper P, such as photo paper, can have a leading end tab and a trailing end tab in which an image is not printed, and the ink removed from the header mark 46 can be transferred to the trailing end tab of the paper P. Since the leading end tab and the trailing end tab are removed after the image is printed, the ink removed from the header mark 46 does not remain on the final image.

Figure 7:
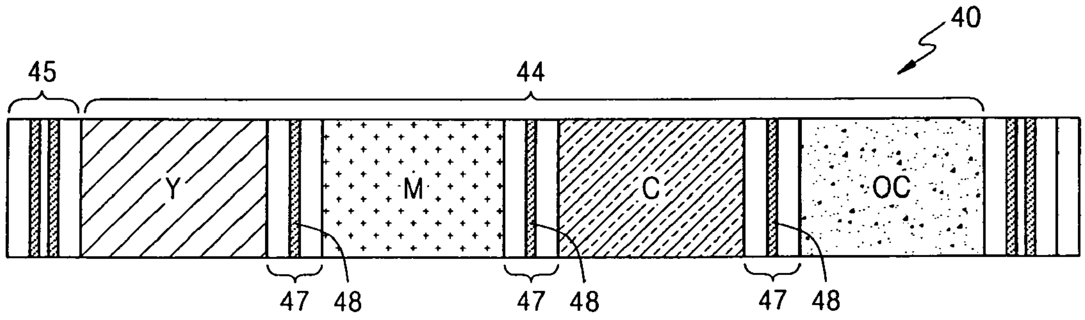
FIGS. 7 and 8 are views illustrating an exemplary ink ribbon for color printing according to embodiments of the present general inventive concept.
Figure 8:
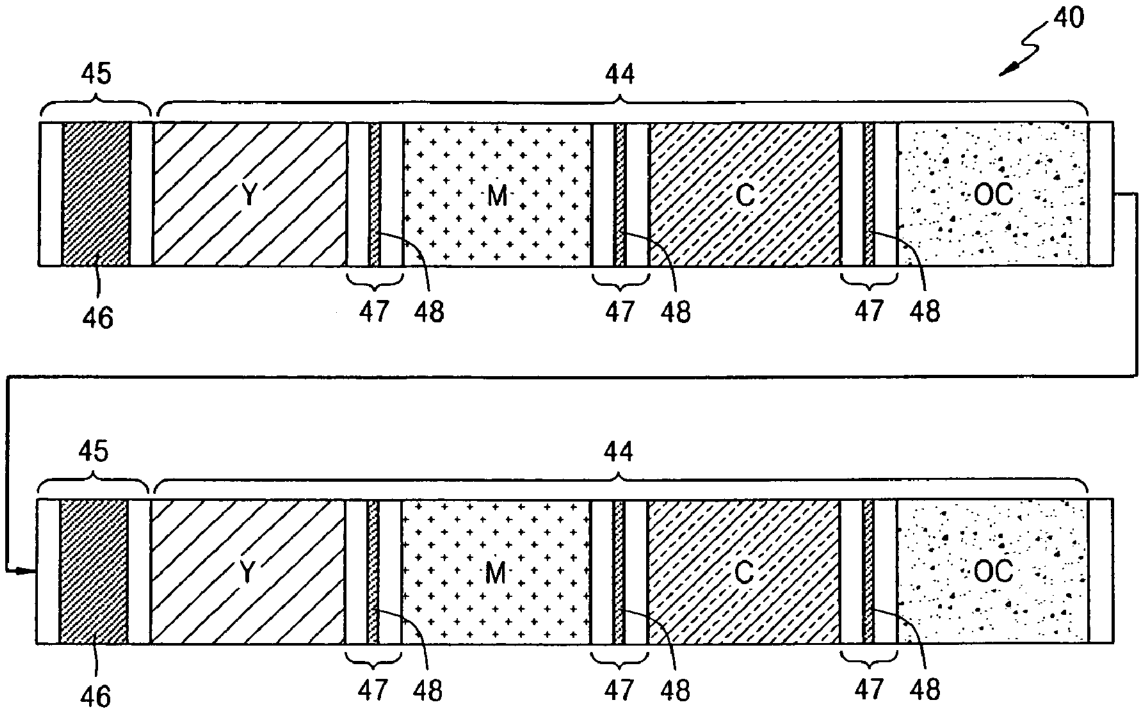

FIG. 7 illustrates an example of the ink ribbon 40 according to another embodiment of the present general inventive concept which is usable for color printing. Referring to FIG. 7, each of the print areas 44 of the ink ribbon 40 usable for color printing is divided into three color print areas Y, M, and C, in which yellow, magenta, and cyan ink layers are respectively formed. The print areas 44 are separated by a plurality of first non-print areas 45. The color print areas Y, M, and C are separated by a plurality of second non-print areas 47. A donor mark 48 to indicate a start position of each of the color print areas Y, M, and C is formed on each of the non-print areas 47. The first non-print areas 45 are provided respectively at the leading end portion of each of the print areas 44. The header mark 46 to indicate the start position of each of the print areas 44 is provided in each of the first non-print areas 45. For example, as illustrated in FIG. 7, the header mark 46 can be formed in two lines while the donor mark 48 can be formed in a single line, to discriminate between the header mark 46 and the donor mark 48. As another example, as illustrated in FIG. 8, a width of the header mark 46 can be greater than that of the donor mark 47. In addition, a variety of shapes of the header mark 46 and the donor mark 47 can be used, as long as the shapes allow discrimination between the header mark 46 and the donor mark 47. An over coating area OC to coat a printed image can be further provided in each of the print areas 44.

When the ink ribbon cassette 10 holding the ink ribbon 40 having the structure as illustrated in FIG. 7 or FIG. 8 is installed in the image forming apparatus, the image forming apparatus first winds the ink ribbon 40 forward slightly, so that the first and second optical sensors 20*a* and 20*b* or another optical sensor (not shown) detect the header mark 46. The optical sensors 20*a* and 20*b* detect the print number mark 50 formed on the header mark 46. If the print number mark 50 is not detected on the header mark 46, the image forming apparatus determines that the installed ink ribbon cassette 10 is new. The ink ribbon 40 and the paper P are transferred through the printing nip N between the platen roller 2 and the thermal head 1. The yellow print area Y of the ink ribbon 40 contacts the paper P The thermal head 1 applies heat corresponding to yellow image information to the ink ribbon 40 such that a yellow image is printed on the paper P. The paper P is transferred in a reverse direction or along a transfer route (not shown) so that the paper P is repositioned at the printing nip N between the platen roller 2 and the thermal head 1. When the paper is repositioned, the magenta print area M of the ink ribbon 40 contacts the paper P. The thermal head 1 applies heat corresponding to magenta image information to the ink ribbon 40 such that a magenta image is printed on the paper P. Likewise, the paper P is then repositioned and a cyan image is printed on the paper P.

Figure 9:
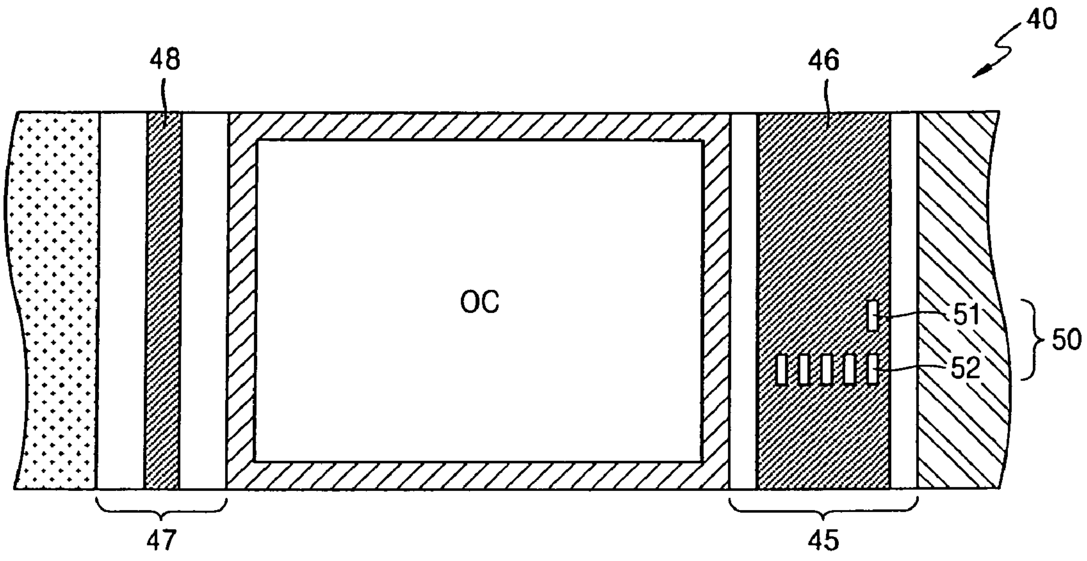
FIG. 9 is a view illustrating an example of forming a print number mark on the ink ribbon for color printing of FIG. 8.
Figure 10:
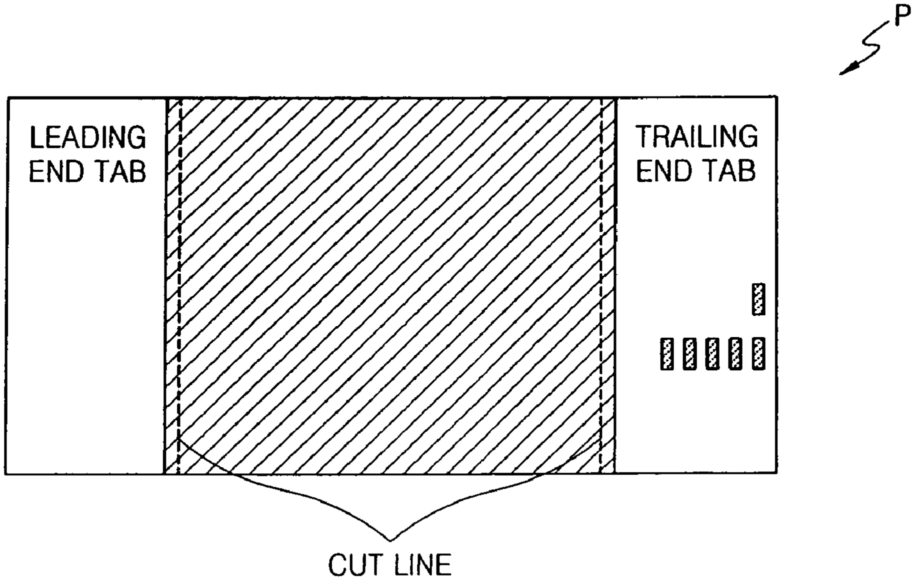
FIG. 10 is a view illustrating a printed sheet of paper having a leading end tab and trailing end tab.

After the yellow, magenta, and cyan images are printed overlapping each other on the paper P to form a color image, the paper is repositioned again, and an over coating is transferred to the paper P from the over coating area OC of the ink ribbon 40 to improve a durability of the printed color image. The print number mark 50 is then formed on the header mark 46 of the ink ribbon 40 after the over coating area OC, as illustrated in FIG. 9. The number information portion 51 in the present embodiment indicates the accumulated print number. FIG. 10 illustrates the paper P having the color image printed thereon. Since a single sheet of the paper P is printed, the number information portion 51 and the sync information portion 52 are indicated on the header mark 46, as illustrated in FIG. 9, and the ink removed from the header mark 46 is transferred to the trailing end tab of the paper P, as illustrated in FIG. 10. Since the ink removed from the header mark 46 is transferred to a portion of the trailing end tab of the paper P, the ink does not remain on the final image after removing the leading end tab and the trailing end tab along a cutting line. The image forming apparatus stops transferring the ink ribbon 40 before the print number mark 50 reaches the optical sensors 20*a* and 20*b*. Since the ink ribbon cassette 10 can be replaced in this state, the accumulated print number is detected correctly when the ink ribbon cassette 10 is replaced.

When the printing of a subsequent page starts, the image forming apparatus winds the ink ribbon 40 forward slightly to detect the print number mark 50 using the optical sensors 20*a* and 20*b*, so that the accumulated print number is detected. Thus, the image forming apparatus recognizes the accumulated print number, and displays information regarding the accumulated print number on a display device.

In the above embodiments, since the number information portion 51 and the sync information portion 52 represented in 5 bits are detected by the two optical sensors 20*a* and 20*b*, the accumulated number of not more than 32 pages can be displayed. The accumulated number of pages to be displayed can be increased by increasing the number of optical sensors 20*a* and 20*b* or the number of bits of the number information portion 51 and the sync information portion 52. Although not shown in the drawings, a total printable page number of the ink ribbon 40 can be detected by detecting an identification mark, such as an identification hole or an optical mark, provided in a case (not shown) of the ink ribbon cassette 10 using a sensor (not shown). The number of pages printable by the print ribbon (the remaining amount of the ink ribbon) is obtained by subtracting the accumulated print number from the detected total printable page number. The display device can display the remaining amount of the ink ribbon in addition to or instead of the accumulated print number. The number information portion 51 can indicate the remaining amount of the ink ribbon obtained by subtracting the accumulated print number from the detected total printable page number rather than the accumulated print number.

When a plurality of images are printed continuously, the print number mark 50 can be formed after every page. It is also possible to form the print number mark 50 after a plurality of consecutive pages are printed (i.e., after the entire print job is completed). In particular, when the ink ribbon 40 without the non-print area 45 and the header mark 46 as illustrated in FIG. 4 is adopted, by forming the print number mark 50 after all of the pages of the print job are printed, the consumption of the ink ribbon 40 to indicate the print number mark 50 can be reduced.

In the above embodiments, the transmission type optical sensors 20*a* and 20*b* are illustrated, in which the light emitting portion 21 and the light receiving portion 22 are arranged to face each other with respect to the ink ribbon 40. Alternatively, a reflection type optical sensor can be adopted, in which the light emitting portion 21 and the light receiving portion 22 are arranged parallel to each other. In this case, a reflection portion to reflect light can be provided at a position facing the reflection type optical sensor.

As described above, a thermal transfer type image forming apparatus and a method of indicating and detecting a remaining amount of an ink ribbon, according to the embodiments of the present general inventive concept can easily indicate the remaining amount of the ink ribbon usable to print an image.

Since, a print number mark is directly indicated on the ink ribbon, even when an ink ribbon cassette is removed from the image forming apparatus and reinstalled therein, the remaining amount of the ink ribbon can be recognized.

Since the print number mark is formed using a thermal head that is used to print an image, a structure of the image forming apparatus is simplified compared to the conventional image forming apparatus that uses a magnetic head to indicate the remaining amount of the ink ribbon.

Since the print number mark is formed after printing is completed, and the image forming apparatus stops transferring the ink ribbon before the print number mark reaches optical sensors of the image forming apparatus, the ink ribbon does not need to run backward to detect the remaining amount of the ink ribbon when a subsequent print is performed or the ink ribbon cassette is reinstalled.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of indicating and detecting a remaining amount of an ink ribbon having a transparent sheet on which an ink layer is formed in a thermal transfer type image forming apparatus which prints an image by applying heat from a thermal head to the ink ribbon to transfer ink to a sheet of paper, the method comprising:

forming a print number mark that is optically detectable on the ink ribbon by removing part of the ink layer by applying heat to the ink ribbon from the thermal head; and detecting the print number mark using at least one optical sensor before a subsequent print starts to determine the remaining amount of the ink ribbon, wherein the ink ribbon comprises: a plurality of print areas divided corresponding to a length of the sheet of paper, each having an ink layer of a predetermined color;

a plurality of non-print areas having a higher light transmissivity and provided at leading end portions of the print areas to separate the print areas; and a header mark provided in each non-print area, on which an ink layer having a low light transmissivity is coated, wherein the forming of the print number mark comprises removing a portion of the ink layer of the header mark.

2. The method as claimed in claim 1, wherein the forming of the print number mark comprises:

forming the print number mark on the ink ribbon after an image is printed.

3. The method as claimed in claim 2, wherein the forming of the print number mark further comprises:

stopping the ink ribbon after the print number mark is formed, before the print number mark reaches a position of the at least one optical sensor.

4. The method as claimed in claim 2, wherein the print number mark indicates the remaining amount of the ink ribbon that is obtained by subtracting an accumulated print number from a total printable number.

5. The method as claimed in claim 2, wherein the print number mark indicates an accumulated print number.

6. The method as claimed in claim 2, wherein the forming of the print number mark comprises:

forming the print number mark whenever a sheet of paper is printed.

7. The method as claimed in claim 2, wherein the forming of the print number mark comprises:

when a plurality of pages are printed continuously, forming the print number mark after the plurality of pages are printed.

8. The method as claimed in claim 1, wherein the forming of the print number mark comprises:

forming a number information portion in a binary system; and forming a sync information portion having figures corresponding to the number information portion, and the detecting of the print number mark comprises:

detecting the number information portion and the sync information portion two optical sensors.

9. The method as claimed in claim 8, wherein the ink ribbon comprises:

a plurality of print areas divided corresponding to a length of the sheet of paper, each having an ink layer of a predetermined color; and a header mark provided at a leading end portion of each of the print areas, on which an ink layer having a low light transmissivity is coated, wherein the forming of the number information portion and the forming of the sync information portion each comprise removing a portion of the ink layer of the header mark.

10. A thermal transfer type image forming apparatus comprising:

an ink ribbon having a transparent sheet on which an ink layer is formed and wound around a supply reel and a take-up reel;

a thermal head to apply heat corresponding to image information to the ink ribbon to transfer ink from the ink ribbon to a sheet of paper, and to form a print number mark which is optically detectable on the ink ribbon by removing part of the ink layer corresponding to a print number; and at least one optical sensor to detect the print number mark wherein the ink ribbon comprises: a plurality of print areas divided corresponding to a length of the sheet of paper, each having an ink layer of a predetermined color;

a plurality of non-print areas having a higher light transmissivity than the print areas and provided at the leading end portions of the print areas to separate the print areas; and a header mark provided in each non-print area, on which an ink layer having a low light transmissivity is coated, wherein the print number mark is formed on the header mark.

11. The apparatus as claimed in claim 10, wherein the print number mark comprises:

a number information portion presented in a binary system; and a sync information portion having figures corresponding to the number information portion, and the at least one optical sensor comprises first and second optical sensors which detect the number information portion and the sync information portion, respectively.

12. The apparatus as claimed in claim 11, wherein the first and second optical sensors are disposed between the thermal head and the take-up reel.

* * * * *